April 8, 1958  H. P. C. JAMIN  2,829,977
METHOD FOR THE PREPARATION OF CONFECTIONARY MASSES
Filed June 29, 1954
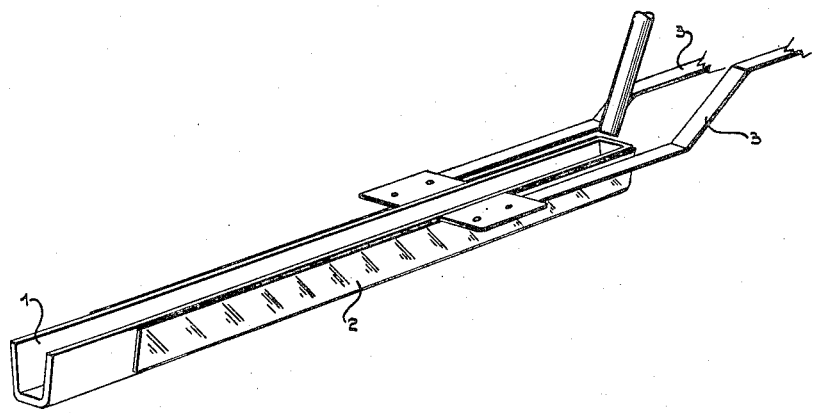

United States Patent Office 2,829,977
Patented Apr. 8, 1958

2,829,977
METHOD FOR THE PREPARATION OF CONFECTIONARY MASSES

Hendrikus Petrus Cornelis Jamin, Rotterdam, Netherlands, assignor to C. Jamin N. V., Rotterdam, Netherlands, a limited company of the Netherlands Application June 29, 1954, Serial No. 440,184
Claims priority, application Netherlands May 10, 1954
5 Claims. (Cl. 99—134)

The invention relates to a method for the preparation of confectionary masses, such as high and low boiled drops mass, fondant mass, hard coffee caramel mass, toffee mass, and the like, by evaporation of a water containing starting mixture.

The masses referred to are in general composed of sugar or mixtures of sugars and water, to which fats, milk components, acids, flavoring and coloring substances, seeds or other components may be added. Usually the components, or only some componets are mixed and dissolved by heating. After that a product with the right consistency and the right water content is prepared by means of evaporation at elevated temperature. This so-called boiling of the mass containing a large portion of sugar and other substances which are sensitive to high temperatures is a treatment which has to be executed exactly and carefully and which usually takes place in evaporating boilers. When boiling it is necesary to avoid superheating or heating for too long or too short a period of time, for such departures from the prescribed heating conditions can result in the failure to obtain an evaporated mass having the desired properties, or in the decomposition, change, excessive evaporation or discoloration of the components of the mass. In many cases, for example, with drops, the boiling therefore takes place, at least partly, under reduced pressure. These procedures require much experience, care and supervision.

It is an object of the invention to provide a method whereby in a surprisingly simple manner the evaporation of the masses mentioned above may be executed continuously and more quickly, while the danger of the heating exerting an undesirable influence on the product is greatly reduced. Another object of the invention is to provide a method having the above advantages and in which the evaporation is entirely controllable.

Still other features and advantages of the invention will appear from the following.

According to the invention a continuous stream of starting mixture is heated dielectrically. This may be carried out in a very simple manner according to the invention by leading the mass through a high frequency electric field, preferably making use of gravity to cause the mass to flow through the field. According to the invention, the mass may be made to flow along an inclining gutter which is provided on the outside with means for generating a high frequency electric field in the gutter. By suitably adjusting the dimensions and the slope of the gutter, the surface of the electrodes provided on the outside thereof and the electric energy supplied to such electrodes, it is possible to evaporate the starting masses to masses with the desired physical properties and composition. The danger of local superheating is entirely excluded, because the mass remains in the gutter for only a short period, and the temperature thereof rises quickly but gradually on its way through the gutter, while water evaporates, so that at the end of the gutter the mass has the desired temperature, composition and properties. The heat is developed in the whole mass and is not supplied from outside, so that local superheating cannot appear at or near the gutter walls. It is to be noted that devices other than the above described gutter may be used in connection with the method embodying this invention. For instance another simple device may be obtained by employing an inclined flat plane, over which the mass flows. The mass also may be led through a high frequency electric field between two electrodes with the aid of mechanical devices for example, a deformable conveyor belt which is transformed into a gutter in the space between the electrodes, or, if desired, the mass may be placed in containers travelling between the electrodes.

Further, in accordance with the invention, the water content of the starting mixture can be considerably smaller than is usual and it is no longer necessary to delay the addition of the more delicate components of the mixture, for example, flavoring substances or substances capable of acting chemically upon the sugar or other components such as acid, until after the evaporation. According to the invention, therefore, it is possible to evaporate a mixture containing much less water, but all components of the confectionary mass, which results in a decrease in the amount of apparatus required.

The method embodying the present invention is further explained below with reference to two comparative examples demonstrating the advantages of the invention.

EXAMPLE I
*Preparation of a mass for drops*

A. USUAL METHOD

To a mixture of:

| | Kg. |
|---|---|
| Crystal sugar | 40 |
| Glucose syrup | 24 |
| Water | 12 | is added a small amount of coloring substance. The final mixture is boiled till the temperature is about 130° C., after which the last quantities of water are removed under reduced pressure. Following the removal of the water, the desired quantities of acid and flavoring substances are added. The boiling period extends over a period of 5 minutes in a modern apparatus.

B. ACCORDING TO THE INVENTION

To a mixture of:

| | Kg. |
|---|---|
| Powdered sugar | 40 |
| Glucose syrup | 24 |
| Water | 1.5 | are added the desired quantities of coloring substance, acid and flavoring substances. The final mixture is led through a high frequency electric field generated in an inclined gutter which is described below. The boiling time is so short that, after only 0.5 minute, the mass flowing out of the gutter already has a temperature of 152° C.

EXAMPLE II
*Preparation of a hard coffee caramel mass*

A. USUAL METHOD

A mixture of:

| | Kg. |
|---|---|
| Sugar | 20 |
| Glucose syrup | 4 |
| Butter | 3 |
| Coffee extract | 1 |
| Water | 3.5 | is prepared. This mixture is boiled for about 9 minutes till a temperature of about 155° C. has been reached.

B. ACCORDING TO THE INVENTION

A mixture of:

| | Kg. |
|---|---|
| Powdered sugar | 20 |
| Glucose syrup | 4 |
| Butter | 3 |
| Coffee extract | 1 |
| Water | 1.5 | is prepared and led through a boiling gutter as described below. After only about 0.5 minute, the mass flowing out of the gutter has a temperature of about 155° C.

An example of a gutter suitable for use in connection with the method according to the invention is shown in the drawing. The gutter may be formed in general of materials having a high dielectric strength, a low coefficient of losses, resistance to deterioration by the substances to be treated and by temperatures up to 200° C., and which, at the temperature of use, are still sufficiently strong. Materials suitable for use in the gutter are steatite, plastics, such as ethoxyline resins, for example, Araldite, polyhalogenoethylene resins, for example, Fluon, Teflon, silicon resins, and the like. The illustrated gutter 1 consists of Araldite F.

Copper strips 2 having a thickness of 1 mm. are provided on the outside of the opposite side walls of the gutter 1, and are connected by conducting strips 3 with the output terminals of a high frequency generator (not shown), which supplies 4 kw. high frequency energy at about 25 mHz. and a working tension of 3 kv. A gutter having the above construction with a length of about 70 cm., an inner width of about 40 mm. and an inner height of about 50 mm., and with the copper strips terminating about 16 cm. before the discharge end of the gutter, has been used for the boiling in the above described Example 1B and yielded therein about 25 kg./h. of excellent drops mass boiled up to 150° C.

Although illustrative embodiments of the invention have been described in detail herein, it is to be understood that the invention is not limited to such precise embodiments, except as defined in the appended claims.

What I claim is:

1. A method for preparing confectionary drop masses and the like comprising the steps of maintaining a continuous flow along a confined flow channel of a starting mixture containing all of the ingredients of the desired mass including water and much more than 50%, by weight, of sugars, and generating a high frequency electric field in said confined flow channel to effect uniform heating of the mixture passing continuously therethrough, thereby to evaporate water from the mixture.

2. A method for preparing confectionary drop masses and the like comprising the steps of continuously feeding a starting mixture containing all of the ingredients of the desired mass, including water and substantially more than 50%, by weight, of saccharides, to the upper end of an inclined channel so as to maintain a continuous flow of the mixture through the channel, and generating a high frequency electric field in said channel so that the continuous flow of mixture through the channel is uniformly heated to effect evaporation of water from the mixture.

3. A method for preparing a confectionary drop mass and the like; comprising the steps of mixing together all of the ingredients of the desired mass including water and substantially more than 50%, by weight, of saccharides, to form a starting mixture, maintaining a continuous flow of the starting mixture along a confined flow channel to which the mixture is supplied at room temperature, and generating a high frequency electric field in said channel to effect the uniform dielectric heating of the mixture passing continuously therethrough, thereby to rapidly evaporate water from the mixture.

4. The method according to claim 3, wherein the generated electric field has a frequency of approximately 25 mHz., and the flow through said confined channel is regulated so that the mixture is affected by said field for a period of approximately 0.5 minute and upon removal of the mixture from the region where it is affected by said field, the mixture has been heated to a temperature of approximately 150° centigrade.

5. A method for preparing a confectionary drop mass and the like comprising the steps of thoroughly mixing together all of the ingredients of the desired confectionary mass including the desired coloring and flavoring substances to provide a homogeneous starting mixture containing much more than 50%, by weight, of saccharides and water, and effecting the rapid evaporation of water from said starting mixture by maintaining a continuous flow of the latter through a confined flow channel and generating a high frequency electric field in said channel for uniformly heating the mixture flowing through the latter.

References Cited in the file of this patent

UNITED STATES PATENTS

| | | |
|---|---|---|
| 1,360,447 | Rudd | Nov. 30, 1920 |
| 1,477,088 | Turner | Dec. 11, 1923 |
| 1,900,573 | McArthur | Mar. 7, 1933 |
| 2,091,149 | Iverson | Aug. 24, 1937 |
| 2,556,185 | Joscelyne | June 12, 1951 |
| 2,585,970 | Shaw | Feb. 19, 1952 |